United States Patent [19]

Thomas et al.

[11] Patent Number: 5,622,668
[45] Date of Patent: Apr. 22, 1997

[54] METHOD FOR PREPARING ORIENTED POLYMER STRUCTURES AND SAID STRUCTURES

[75] Inventors: Edwin L. Thomas, Natick; Ramon J. Albalak, Brookline, both of Mass.

[73] Assignee: The United States of America as represented by the Secretary of the Air Force, Washington, D.C.

[21] Appl. No.: 168,791

[22] Filed: Dec. 8, 1993

Related U.S. Application Data

[62] Division of Ser. No. 832,469, Feb. 7, 1992, abandoned.

[51] Int. Cl.⁶ .................................................. D02J 1/22
[52] U.S. Cl. ............................ 264/289.3; 264/290.2; 72/91; 72/110; 425/363; 425/383; 19/237; 19/242; 523/331
[58] Field of Search ........................ 264/289.3, 290.2; 72/91, 110; 425/363, 383; 19/237, 242; 523/331

[56] References Cited

U.S. PATENT DOCUMENTS

| | | | |
|---|---|---|---|
| 3,146,490 | 9/1964 | Cooney | 18/2 |
| 3,503,237 | 3/1970 | Marcovitch | 72/80 |
| 3,685,331 | 8/1972 | Marcovitch | 72/190 |
| 3,874,833 | 4/1975 | Ancker | 425/115 |
| 4,233,832 | 11/1980 | Rowell | 72/91 |
| 4,963,309 | 10/1990 | Gohlisch et al. | 264/175 |
| 5,030,079 | 7/1991 | Benzing, II | 425/140 |

OTHER PUBLICATIONS

Gaskell, R.E. "The Calendering of Plastic Materials" Journal of Applied Mechanics, Sep. 1950; pp. 334–336.

Admundson et al., "Effect of an Electric Field on Block Co–Polymer Microstructure", *Macromolecules*, 24:6546 (1991).

Morrison et al., "Effect of Unidirectional Shear on the Structure of Triblock Copolymers", *Macromolecules*, 23:4200 (1990).

Morrison et al., "Effect of Unidirectional Shear on the Structure of Triblock Copolymers", *Macromolecules*, 22:3533 (1989).

Ishizu et al., "Orientation on microdomains of diblock copolymers", *Polymer*, 31:2047 (Nov. 1990).

*Primary Examiner*—Paul R. Michl
*Assistant Examiner*—U. K. Rajguru
*Attorney, Agent, or Firm*—Stanton E. Collier

[57] ABSTRACT

A system for preparing oriented block copolymer structures includes a copolymer solution, a device capable of providing a flow field and an evaporation device. The device can be at least two cylinders that are parallel and adjacent to one another to form a nip and a driving mechanism to rotate each cylinder. Means for controlling a solvent environment and evaporation are provided. A method for preparing oriented block copolymer structures includes providing at least two cylinders which are parallel and adjacent to one another so as to form at least one nip, rotating each of the cylinders such that at the nip the cylinder surfaces are moving in the same direction with substantially the same or different tangential velocity, introducing a block copolymer solution into one of the nips of the rotating cylinders, thereby subjecting the polymer solution to a flow field and whereby orientation of the solution begins and evaporating the solvent from the block copolymer solution, whereby ordered microphase separation occurs and the oriented block copolymer structure is formed on the surface of at least one cylinder.

18 Claims, 5 Drawing Sheets

FIG. 6b

METHOD FOR PREPARING ORIENTED POLYMER STRUCTURES AND SAID STRUCTURES

The United States Government retains rights to this invention by virtue of research funding by the United States Air Force under Grant ASOSR-900-150.

This application is a division of 07/832,469, filed Feb. 7, 1992, now abandoned.

BACKGROUND OF THE INVENTION

This invention relates to microphase orientation of block copolymers. The invention further relates to an apparatus and method for the orientation of block copolymer structures.

Block copolymers are macromolecules composed of segments of different covalently bonded homopolymers. At equilibrium, block copolymers segregate into microdomains consisting of primarily one homopolymer with covalent bonds to the second homopolymer of the block copolymer existing at the interfaces. These microdomains have a local orientation resulting in local anisotropy of the material. Improved macroscopic orientation of these domains would impart anisotropic mechanical, magnetic, electrical and optical properties to the block copolymer. The improved properties suggest applications in optical wave guides and uses as membranes and laminates.

SUMMARY OF THE INVENTION

It is the object of the present invention to provide a system for preparing block copolymer structures with aligned microdomains with a high degree of order. It is further an object of the present invention to provide a method for preparing block copolymer structures of near single crystal quality.

In one aspect of the invention, a system is provided for preparing oriented microphase-separated block copolymer. The system includes a block copolymer solution, a device capable of providing a flow field for the block copolymer solution, thereby subjecting the copolymer solution to fields of shear and/or elongation and/or compression which start the orientation of the polymer in solution. An evaporation device is provided for evaporation of the solvent whereby ordered microphase separation occurs and the oriented copolymer structure is formed.

In a preferred embodiment, the device adapted to provide a flow field includes at least two cylinders that are parallel and adjacent to one another so as to form at least one nip and a driving mechanism for rotating each cylinder such that the cylinder surfaces at the nip are moving in the same direction with the same or different tangential velocity. The copolymer solution flows continuously between the rotating cylinders thereby creating a flow field which begins the orientation of the copolymer. Upon evaporation of the solvent, microphase separation occurs and an oriented block copolymer film is deposited on at least one cylinder. This particular embodiment is referred to hereinafter as the "adjacent cylinders" system.

In another embodiment of the adjacent cylinders system, a multiplicity of cylinders are arranged around a central cylinder such that the central cylinder forms a nip with each cylinder at intervals around the circumference of the central cylinder. The film is formed on the central cylinder by using cylinders coated with or made from a high release material for the peripheral cylinders.

In yet another preferred embodiment, the device adapted to provide a flow field includes an inner cylinder and an outer cylinder and a driving mechanism for rotating at least one cylinder. The cylinders are eccentric and the inner cylinder is located parallel to and in the interior of the outer cylinder, such that the outer surface of the inner cylinder approaches the inner surface of said outer cylinder and such that the surfaces of the cylinders at the point of closest approach are moving in the same direction and with the same or similar tangential velocity. A driving mechanism rotates at least one of the cylinders. In a preferred embodiment, at least one cylinder is independently driven and cylinders communicating with the rotating cylinder are themselves put into motion. Preferably the outer cylinder is mechanism-driven, while the inner cylinder rotates by communication with the outer cylinder. In another preferred embodiment, the inner cylinder may also be independently driven by an external mechanism. The copolymer solution flows continuously between the rotating cylinders at said nip thereby creating a flow field. Upon evaporation of the solvent, microphase separation occurs and an oriented block copolymer film is deposited on at least one cylinder. This particular embodiment of the invention is referred to hereinafter as the "eccentric cylinders" system.

The device for rotating the cylinders can be any conventional driving mechanism, such as an electric motor. It will be recognized by those skilled in the art that other means of driving the cylinders are possible and within the scope of the present invention.

In the eccentric cylinders system described immediately above, the nip gap is initially essentially zero and is finally the thickness of the oriented layer. The nip gap is affected by a number of factors, such as, the viscosity of the polymer solution, the thickness of the final structure and the strength of the flow field. In the adjacent cylinders systems, the nip gap can be set to any desired value and can also be varied during operation.

The cylinders of the adjacent cylinders system are not required to be of the same diameter. The diameter of the cylinders can be selected to obtain a desired flow field. A preferred flow field will be obtained for cylinders of substantially equal diameter. The relative sizes of the two cylinders forming a nip will affect the residence time of the copolymer solution and the contact angle and area of the copolymer solution in the nip area.

The eccentric cylinders system is required to have a smaller inner cylinder. Preferably, the diameter of the inner cylinder is in the range of 30 to 90 percent of the diameter of the outer cylinder. The relative sizes of the two cylinders forming the nip will affect the residence time of the copolymer solution and the contact angle and area of the copolymer solution in the nip area.

The cylinders of both the adjacent cylinders and eccentric cylinders systems are rotated at a measurable tangential velocity. The tangential velocity may be varied during use. For example, as the flowing solution becomes more viscous and relaxes at a slower rate, the tangential velocity can be decreased. An important factor in determining the optimal tangential velocity is the ratio of the tangential velocity to the relaxation rate of the copolymer. The time elapsed between successive passages of the copolymer through the nip should not be sufficient to allow relaxation (and possible disordering) of the copolymer. The optimal tangential velocity is a function of the relaxation rate of the polymer, the residence time of the polymer solution in the nip area and the strength of the flow field.

The cylinders used in preferred embodiments are prepared from conventional materials that are inert with respect to the copolymer solutions. A partial list of acceptable materials includes stainless steel and aluminum. In another preferred embodiment of the invention, at least one of the cylinders is made from or coated with a high release material, such as polytetrafluoroethylene. This prevents the copolymer solution and the resultant oriented film from sticking to the cylinder. In another preferred embodiment, at least one cylinder is coated with a material that interacts with at least one of the copolymer blocks. The material can be, for example, a polar surface that will interact preferentially with the polar block of the copolymer.

The evaporation device can be any conventional apparatus used for the evaporation of solvents. In a preferred embodiment of the invention, the evaporation device can include a gas flow field which passes over the cylinder surfaces. Conventional methods of creating a gas flow field are within the scope of the invention. These include, but in no way are limited to, air knives, air jets and ventilation systems. The gas flow field can be parallel or perpendicular to the cylinder axes. The evaporation device can further include a chamber surrounding the rotating cylinders and a vacuum apparatus capable of lowering the chamber pressure below atmospheric pressure.

In another preferred embodiment of the invention, means of providing a controlled solvent environment over the cylinders is provided. Such a device could be a container surrounding the system and communicating with a solvent reservoir. The temperature of the solvent can also be controlled to promote controlled solvent evaporation. In another preferred embodiment of the invention, a heater is provided capable of heating the surfaces of the cylinders. The cylinders can be heated at different points in the operation of the system to promote controlled solvent evaporation.

In another aspect of the present invention, a method for preparing oriented block copolymer structures includes providing at least two cylinders which are parallel and adjacent to one another so as to form at least one nip, rotating each of the cylinders such that at the nip the cylinder surfaces are moving in the same direction with substantially the same or different tangential velocity, introducing a block copolymer solution into one of the nips of the rotating cylinders, thereby subjecting the polymer solution to a flow field and whereby orientation of the solution begins and evaporating the solvent from the block copolymer solution, whereby ordered microphase separation occurs and the oriented block copolymer structure is formed on the surface of at least one cylinder. The block copolymer can be any diblock, triblock or multiblock copolymer. The solution can additionally contain homopolymer(s). The solvent can be a solvent mixture, a non-preferential solvent or a preferential solvent. In some embodiments, a non-preferential solvent is preferred. By non-preferential solvent, it is meant that the solvent has no preferred affinity for either homopolymer segment of the block copolymer.

In a preferred embodiment, the factors determining the optimal tangential velocity of the cylinders at the nip comprise the relaxation rate of the polymer, the residence time of the polymer solution in the nip area and the strength of the flow field.

In preferred embodiments, a second block copolymer solution is applied to the cylinders after the first block copolymer solution has been coated onto a cylinder as an oriented copolymer structure. The second copolymer solution can be the same in composition as the first block copolymer solution, resulting in a thicker structure of uniform composition. Alternately, the second block copolymer solution can be of a different composition. Treatment of the first block copolymer film to set or cross-link the block copolymer film is possible to prevent redissolution of the copolymer film upon application of the second block copolymer solution. Such treatment includes ultraviolet irradiation, electron beam irradiation and chemical crosslinking.

BRIEF DESCRIPTION OF THE DRAWING

In the Drawing:

FIG. 4 is a schematic representation of (a) the nip region in a roll-casting apparatus as shown in FIG. 3 and (b) the nip region in a roll-casting apparatus as shown in FIG. 1;

FIG. 6 is a transmission electron microscopy (TEM) photomicrograph of a microphase separated block copolymer prepared (a) according to the prior art and (b) according to the present invention.

DESCRIPTION OF THE PREFERRED EMBODIMENT

During microphase separation, block copolymers segregate into microdomains consisting of different homopolymer segments with chemical bonds existing across the interfaces. By homopolymer, as that term is used here, it is meant a polymer consisting of one type of monomer unit.

The morphology formed during microphase separation depends upon the molecular weights of the homopolymer segments and the fraction of each of the homopolymers in the overall system. When the fraction of either homopolymer is far from 0.5, then the minority component tends to form domains in a matrix composed of the majority component. The domains range from spheres at low fractions of the minority component through cylinders to the ordered bicontinuous double-diamond structure (OBDD) at higher fractions of the minority component. At even higher fractions for which the amount of both components is comparable, a lamellar structure is formed. The typical size of the microdomains is on the order of several hundred Angstroms, which in turn may assemble in grains reaching on the order of microns.

Grains composed of cylindrical or of lamellar microdomains have a local preferred orientation resulting in local anisotropy of the material. Since these grains are relatively small in comparison to the dimensions of the whole sample and since they are often in a random distribution, the resultant macroscopic sample usually displays isotropic properties. Diblock and triblock copolymers have been treated with the intention of orienting the microstructure on a larger scale and improving the overall anisotropy of the material.

Previous attempts to orient or align block copolymers microdomains involved mechanical deformation or application of an electrical field to the material above the glass transition temperatures of all the components, i.e., in a molten microphase-separated state. Above the glass transition temperature, the thermal motion of the polymer chains increases so that, some reorientation of the polymer is possible. These techniques resulted in improved alignment of the copolymer microstructure. Orientation was improved by the reorientation of pre-existing grains in the material. However, because the grains have a "memory" of their original position there is oftentimes a relaxation to a more disordered state. The present invention affords a microstructure of a single-crystal nature without grain boundaries and therefore provides oriented block copolymer structures with improved stability.

An electric field has also been successfully applied at elevated temperatures to orient a homogeneous copolymer material as it microphase separates. The orientation of lamellae parallel to the free surface in symmetric diblock polymers has also been previously demonstrated.

The present invention provides macroscopic orientation of block copolymer structures with a marked improvement in the degree of order over the prior art structures by flow of a concentrated polymer solution at room temperature, i.e., above the microphase separation transition (MST) temperature of the solution. For the purposes of the present invention, any diblock, triblock or multiblock copolymer can be used. Any solvent with the appropriate solubility can be used. Furthermore, any block copolymer composition can be used although orientation of spherical microdomains will be poor.

According to the invention, a block copolymer solution is placed in a flow field, thereby subjecting the solution to fields which form initially aligned microdomains in solution. Any flow field sufficient to align the copolymer and any means of achieving the flow field are within the scope of the invention.

Figure 1:
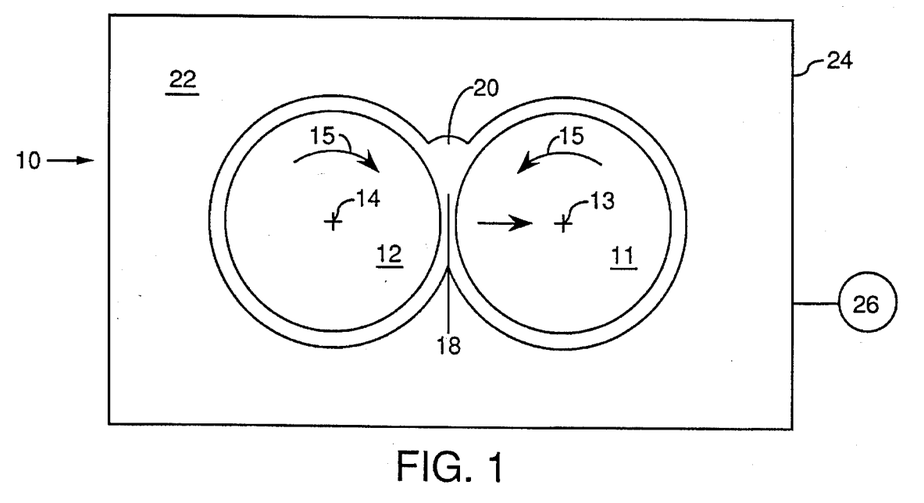
FIG. 1 is a cross-sectional view of an apparatus according to one preferred embodiment of the invention.

A system according to one aspect of the invention for orientation of block copolymer microdomains is illustrated in FIG. 1. The system is referred to hereinafter as a roll-casting system. The system 10 consists of two adjacent and parallel cylinders 11 and 12 and is similar to the conventional set-up of calendars or roll-mills. The cylinders 11 and 12 counter-rotate on axes 13 and 14, respectively, in the directions indicated by arrows 15 so that a nip 18 is formed between them. Each of the cylinders 11 and 12 is independently powered by a driving mechanism (not shown). However, as the cylinders are not required to have identical diameters, they may be rotated at the appropriate angular velocity in order to maintain substantially equal or different tangential velocities at nip 18. A maximum flow field is obtained when the tangential velocities are comparable. A block copolymer solution 20 is applied to the nip 18 of the rotating cylinders 11 and 12. The evaporation device can include a gas flow field indicated by arrow 22 over the surface of the cylinder 11 and 12. Alternately, the cylinders and solution can be housed in a chamber 24 which communicates with a vacuum apparatus 26. One of the cylinders can be made from or coated with a high release material, such as polytetrafluoroethylene, to prevent adhesion of the film on that cylinder.

Figure 2:
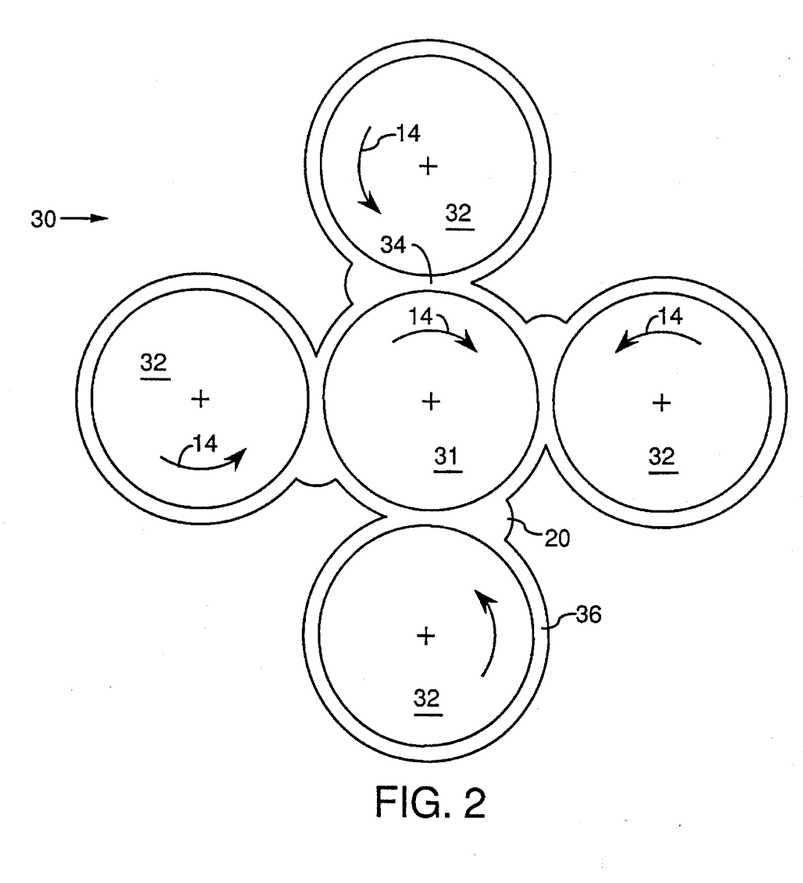
FIG. 2 is a cross-sectional view of an apparatus according to a second preferred embodiment of the invention.

FIG. 2 illustrates a system 30 for another preferred embodiment of the invention where a multiplicity of cylinders are used. A central cylinder 31 is surrounded about its circumference by peripheral cylinders 32. Each cylinder 32 forms a nip 34 with the central cylinder 31. The peripheral cylinders 32 are coated with or made from a high release material 36 so that the block copolymer film 20 is formed preferentially on the central cylinder 31. In the particular arrangement shown in FIG. 2, each complete rotation of the central cylinder 31 subjects the block copolymer solution to four flow fields resulting in more efficient and rapid alignment of the block copolymer microdomains. FIG. 2 is not intended to limit the system to just four peripheral cylinders and it is appreciated that any number of cylinders of equal or unequal diameter are contemplated within the scope of the invention.

Figure 3A:
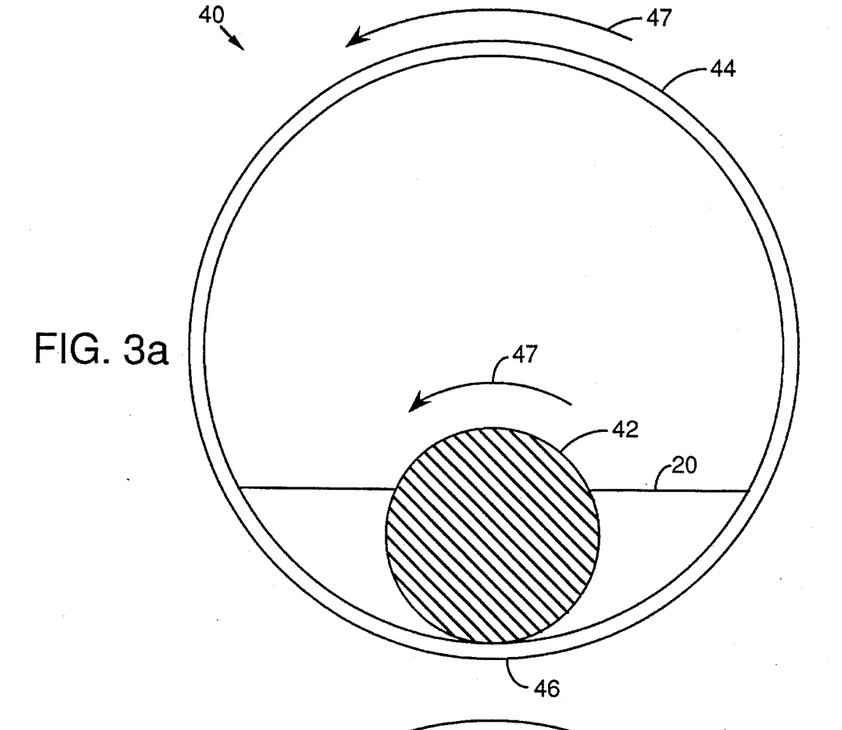
FIG. 3 is a cross-sectional view of an apparatus according to a third preferred embodiment of the invention.
Figure 3B:
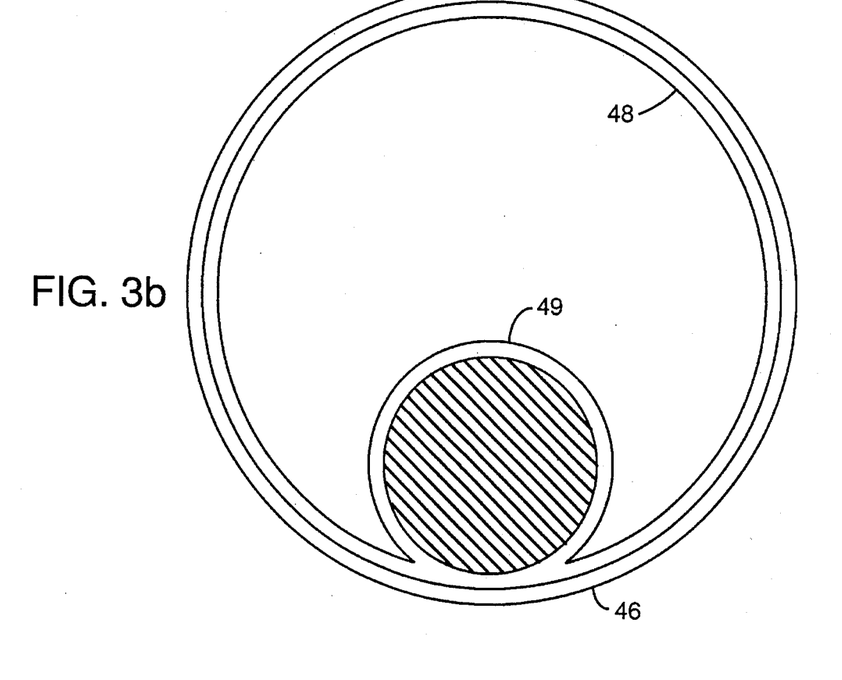

FIGS. 3a and 3b illustrate an eccentric cylinders system 40 for orientation of block copolymer structures. Referring to FIG. 3a, the system includes an inner cylinder 42 and an outer cylinder 44. The cylinder 42 nests inside the cylinder 44, thereby forming a nip 46 at the point of closest approach. The cylinders 42 and 44 co-rotate in the direction indicated by arrows 47. A driving mechanism (not shown) communicates with cylinder 44. Cylinder 42 rotates by communication with the outer cylinder 44 at the same or similar tangential speed. The inner cylinder 42 can be a solid cylinder or filled with mercury to provide added weight. The inner cylinder may be independently driven by an external mechanism (not shown). A block copolymer solution 20 is introduced into the nip 46. An evaporation or controlled solvent device similar to those illustrated in FIG. 1 can be used. As the solvent evaporates, the concentration of the solution increases and a film is formed on both an inner side 48 of the outer cylinder 44 and an outer side 49 of the inner cylinder 44 (see FIG. 3b). It is apparent from this description of the system 40 that the nip gap is not an independent variable. The nip gap at nip 46 in FIG. 3a is essentially zero in the early states of processing the polymer solution. The nip gap at nip 46 in FIG. 3b is the thickness of the film at the late stages of processing the polymer solution.

The usual setup of rotating rolls in polymer processing is either as calendars or as roll-mills. In both these cases polymer melt flows between adjacent rolls, passing through a minimum gap called the nip and coating one or both of the rolls. Gaskell ("The Calendaring of Plastic Materials", *J. Appl. Mech.* 17, 334 (1950)), herein incorporated by reference, presented an analysis of the flow of plastic materials between calendars of equal radii. Later Tadmor and Gogos ("Principles of Polymer Processing", Wiley, New York, N.Y. (1979)), herein incorporated by reference, rederived the expressions for the pressure and velocity profiles of a plastic material in this flow field. A brief summary of the key points relevant to this discussion is presented. This theory is presented to explain the observed alignment of a block copolymer solution in a flow field and in no way is intended to limit the scope of the invention.

Figure 4A:
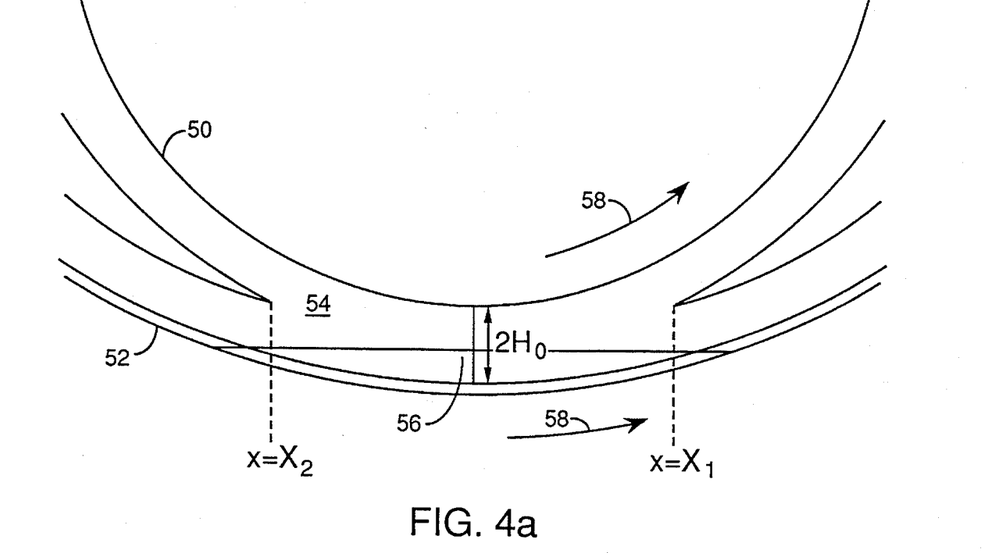
Figure 4B:
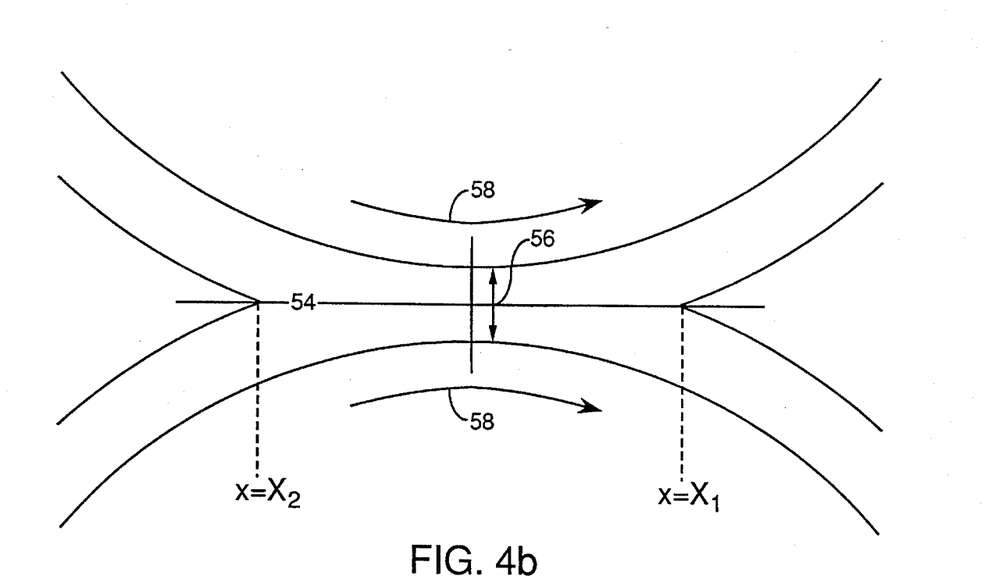

The model used in the present discussion is shown in FIG. 4a for the eccentric cylinders system in which a cylinder 50 of radius $R_1$ lies within a larger cylinder 52 of radius $R_2$. A polymer solution 54 is assumed to be uniformly distributed laterally and to separate the two cylinders by a gap clearance equal to 2H which reaches a minimum of $2H_o$ at a nip 56. Cylinders 50 and 52 rotate in the directions indicated by arrows 58. The cylinders 50 and 52 begin "biting" on the polymer at a location $x=X_2$ upstream from the nip 56 and the polymer 54 remains in close contact with both cylinders up to a detachment point $x=X_1$ downstream from the nip 56. The locations of points $X_1$ and $X_2$ depend on the radii, the viscosity and density of the solution and on its volume. For the system of FIG. 4a, the weight of the inner cylinder is also a factor. Using conventional methods, the shear and elongation/compression rate and units in the fluid can be determined. Extremely large values can be obtained using the apparatus of the present invention. FIG. 4b illustrates these parameters for the adjacent cylinders system shown in FIG. 1.

One of the additional characteristics of the present system is that the velocity profile is not fully developed. This results in an elongational flow upstream and a compressional flow down stream from the nip. The total number of shear and elongation/compression units experienced by the material may be found by estimating the fraction of time in each rotational cycle that the material is in contact with both rolls. In FIG. 4a, the fraction of time in each cycle in which the material undergoes alignment in the contact zone from $X_2$ to $X_1$ will increase as $R_1$ approaches $R_2$. Hence, maximum orientation occurs with cylinder of comparable radii.

When the material in not in contact with the cylinders, it may undergo stress relaxation. The extent to which the material relaxes may be reduced by rotating the cylinders at higher tangential velocities or passing the material through several nips in a single cycle (as in FIG. 2), thereby reducing the relaxation time between contacts. Although relaxation may take place in between successive contact periods, there seems to be no reason for any misalignment of molecules or microstructures to occur that have been previously aligned. Stress is also expected to relax downstream from the nip in the compression zone and may possibly be accompanied by some degree of misalignment. However, the combined effects of shear and compression in this region are unclear and the effects of compression may in fact be beneficial to the overall alignment.

The elongational component of the flow field is significant in achieving the alignment of both the polymer molecules and, later, the microstructures resulting from microphase separation. Whereas pure shear may have a "tumbling" effect on the molecules and microstructure, elongational flow has the ability to (re)align and stretch them in flow direction.

According to the invention, a typical oriented microphase-separated block copolymer structure is prepared in the following way. The method is referred to hereinafter as roll-coating. A particular triblock copolymer material used is a polystyrene-polybutadiene-polystyrene (PS/PB/PS) triblock copolymer with a butadiene centerblock of 58,000 molecular weight and styrene endblocks of 11,000 molecular weight each (SBS 1158-11) with a nominal composition of 31% wt polystyrene. At this composition, microphase separation is expected to form polystyrene cylinders in a polybutadiene matrix. A particular diblock copolymer material used is a polystyrene-poly(ethylene/propylene) diblock copolymer stated by Shell Chemical Co. to have a nominal composition of 37% wt. polystyrene.

Concentrated diblock and triblock solutions are made up as several ten's of weight percent in a solvent such as toluene or cumene. For concentrations below the MST, the process is not dependent on the initial starting concentration of the polymer solution. The concentration is selected to obtain a workable viscosity below the point of microphase separation. Cumene is preferred as a solvent for the polystyrene-polybutadiene system for two reasons. First, it is a less preferential solvent than toluene and is known to be nonselective for styrene and butadiene blocks. Secondly, cumene has a lower vapor pressure than toluene which permits an even slower (and more controlled) rate of solvent evaporation. An aliquot of solution is introduced into the nip area and flows continuously between the rotating cylinders. As the solvent is evaporated and the concentration of the solution rises, block copolymer microphase separation occurs and a film forms on any cylinder that is not coated or made from a high release material. According to the different embodiments, a typical PS/PB/PS solution is roll-cast on the order of several minutes to several hours, dependant upon the rate of solvent evaporation and the characteristics of the particular polymer/solvent combination.

It is important to have control over the rate of evaporation. Slow evaporation allows maximal alignment to occur before the solution reaches a critical concentration and the polymer freezes into its final orientation. Use of a solvent-saturated environment is a useful way of slowing down the rate of solvent removal during the critical processing period when the microdomains are forming in an aligned state. Solvent can be introduced above the cylinders in the gas flow field. Solvents can also be heated to further control evaporation. When all the copolymer coats the cylinder surface, no liquid is observed in the system. At this point, the film may still contain a significant amount of solvent in the copolymer film. Warming the films is desirable to drive off the residual solvent. A cylinder equipped with a heater can be used for this purpose. Reduced-pressure evaporation can also be used.

Films in a wide range of thicknesses can be successfully cast. In order to cast thicker ill_re_s, a second portion of copolymer solution can be introduced after a first portion of copolymer solution has been treated according to the invention. Additional copolymer solutions alternately can have a different composition so as to obtain a range of anisotropic properties in the resultant oriented structure. The method overcomes the thickness limitations encountered in most of the prior art approaches mentioned above.

Figure 5:
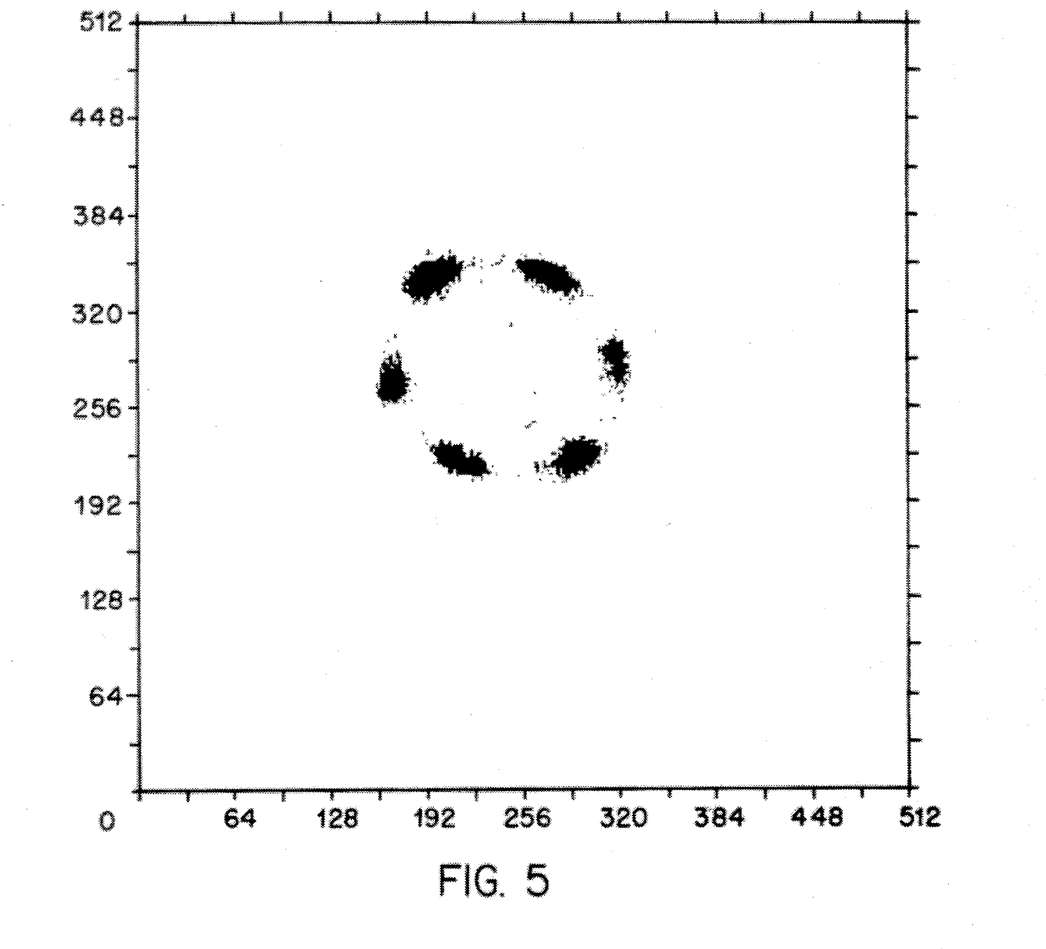
FIG. 5 is a 2-D small angle X-ray scattering (SAXS) pattern of a roll-cast film in which the path of the X-ray was parallel to the orientation of the polystyrene cylinders.
Figure 6A:
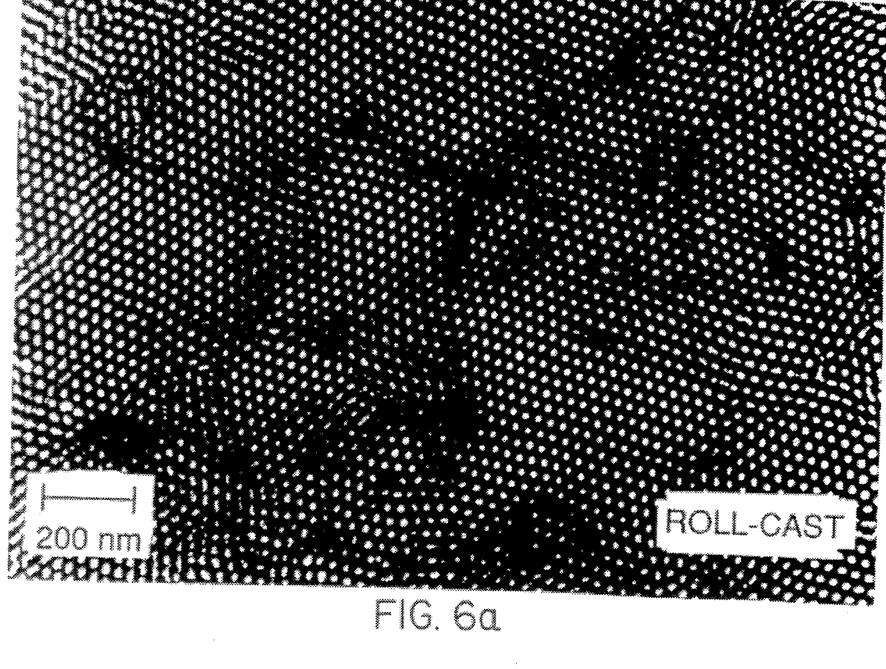
Figure 6B:
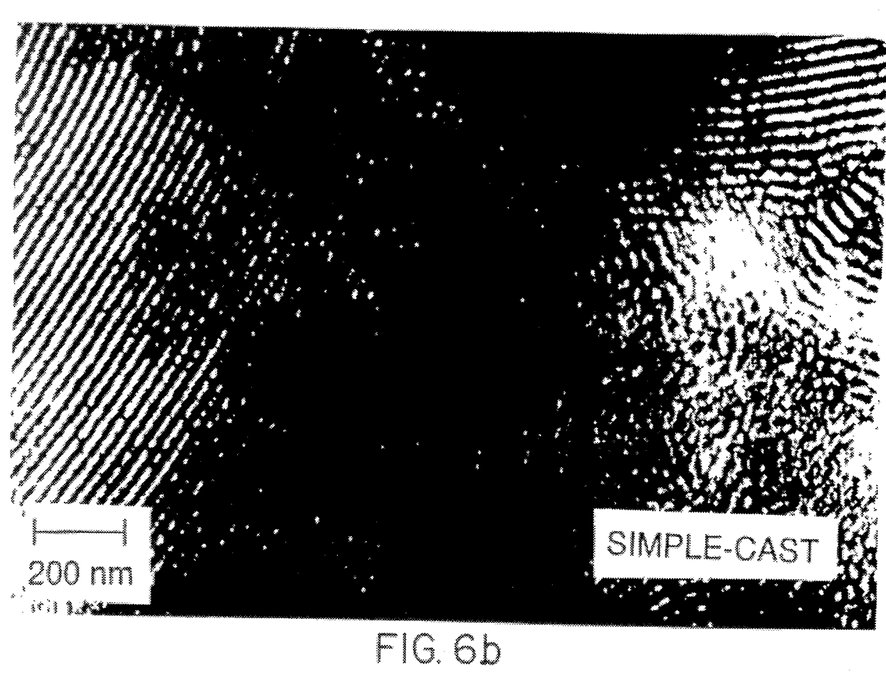

The anisotropy resulting from the uniform orientation of polystyrene cylinders throughout the sample is confirmed by small angle X-ray scattering (SAXS) observations. FIG. 5 is a 2-D SAXS pattern of a typical roll-cast film in which the path of the X-ray was parallel to the orientation of the polystyrene cylinders. This figure indicates that the microstructure of the roll-cast films is not only highly oriented but also approaches that of a single crystal with hexagonal symmetry. Additional support for the marked improvement in alignment of roll-cast films is seen by comparison of the photographs in FIG. 6a and 6b. FIG. 6a is a transmission electron microscopy (TEM) photomicrograph of a film produced according to a prior art method described above. FIG. 6b is a TEM photomicrograph of a film produced according to the present invention showing uniform arrangement of the cylinders in a near single-crystal hexagonal an-ay. A series of experiments was carried out according to the procedure described immediately above. A system similar to that illustrated in FIG. 1 was employed. The experimental conditions (relative proportion of polystyrene and polybutadiene, solvent and casting time) are reported in Table 1, as well as the morphology of the final oriented structure and a qualitative assessment by SAXS of the degree of alignment.

TABLE 1

Roll-casting conditions and degree of alignment

| run | solvent | p/s[1] | casting time (min) | structure[2] | alignment |
|---|---|---|---|---|---|
| 1 | cumene | 1:2 | 120 | cylinder | good |
| 2 | cumene | 1:2 | 15 | cylinder | none |
| 3 | chloroform | 1:2 | 10 | cylinder | fair |
| 4 | cumene | 1:2 | 30 | cylinder | good |
| 5 | cumene | 1:4 | 60 | lamellae | good |
| 6 | cumene | 1:2 | 100 | cylinder[3] | good |
| 7 | cumene | 1:2 | 120 | spheres | none |

[1]ratio of weight polymer (g) and the volume of solvent (ml)
[2]at equilibrium
[3]refers to structure of 90% component Comparison of runs 1 and 2 shows the effect of roll-casting time. A sample roll-cast for two hours shows a high degree of alignment. No alignment is found for the same composition roll-cast for 15 minutes and then left to dry on a single rotating cylinder after increasing the nip so that there was no contact between the cylinders. Very little solvent evaporated during the 15 minutes of induced flow and the concentration of polymer was still below that of the microphase separation so that there were no domains to align.

Comparison of runs 2 and 3 shows that shorter casting times require a high vapor pressure solvent to obtain alignment. A 10 minute run using chloroform was sufficient to reach microphase separation and to partially align the microdomains. However, rapid rate of evaporation did not allow for complete alignment and the polystyrene cylinders lost their mobility before the flow field could have its full effect. Use of a chloroform-saturated environment would improve degree of alignment by slowing down the rate of evaporation.

Run 5 shows that other microstructures may be successfully oriented by roll-casting. Run 6 contains an additional 10% wt polystyrene homopolymer and indicates that blends may also be aligned by roll casting. SAXS and TEM indicate that the homopolymer polystyrene has phase-separated from the block copolymer into ellipsoidal domains and that very little of the homopolymer exists in the PS-segment of the microdomains. Run 7 indicates that, as expected, isotropic microstructures can not be aligned under the flow conditions. It is likely, however, that ellipsoids rather than true spheres may form under flow field conditions.

What is claimed is:

1. A method for preparing oriented block copolymer structures comprising the steps of:

providing at least two cylinders which are parallel and adjacent to one another so as to form at least one nip;

rotating said cylinders such that at said nip the cylinder surfaces are moving in the same direction;

introducing a block copolymer solution into one of the nips of said rotating cylinders above the microphase separation transition, thereby subjecting the polymer solution to at least one flow field and whereby orientation of the polymer begins;

inducing a microphase separation of said block copolymer solution to form an oriented block copolymer structure, said oriented block copolymer structure being a film formed on the surface of a predetermined cylinder: and removing said oriented copolymer structure from said predetermined cylinder, whereby said structure being highly oriented approaches that of a single crystal with geometric symmetry.

2. The method of claim 1 wherein said cylinders are rotated at substantially the same tangential velocity.

3. The method of claim 1 wherein said cylinders are rotated at a different tangential velocity.

4. The method of claim 1 wherein said solvent is selected from the group containing non-preferential solvent, preferential solvent and solvent mixtures.

5. The method of claim 1 wherein said block copolymer is any diblock, triblock or multiblock copolymer.

6. The method of claim 1 wherein said block copolymer solution additionally comprises homopolymer(s).

7. The method of claim 1 wherein the factors determining the optimal tangential velocity of the cylinders at the nip comprise the relaxation rate of the polymer, the residence time of the polymer solution in the nip area and the strength of the flow field.

8. The method of claim 1 further comprising the steps of:

applying a second block copolymer solution to the cylinders after the first block copolymer solution has been coated onto a cylinder as an oriented copolymer film.

9. The method of claim 8 wherein the first oriented copolymer solution is treated by ultra-violet irradiation prior to said application of said second block copolymer solution.

10. The method of claim 8 wherein the first oriented copolymer solution is treated by electron beam irradiation prior to said application of said second block copolymer solution.

11. The method of claim 8 wherein the first oriented copolymer solution is treated by a chemical process prior to said application of said second block copolymer solution.

12. The method of claim 8 wherein said second block copolymer solution comprises a same composition as the coated oriented copolymer film.

13. The method of claim 8 wherein said second block copolymer solution comprises a different composition as the coated oriented copolymer.

14. The method of claim 1 further including the step of heating said solvent.

15. The method of claim 1 further including heating the copolymer solution.

16. The method of claim 1 further including heating of the film to drive off residual solvent.

17. A method for preparing oriented block copolymer structures, said method comprising the steps of:

preparing a copolymer solution of at least one block type copolymer;

placing said copolymer solution in an apparatus which creates at least one flow field to orient polymers therein;

evaporating solvent material from a film formed by said apparatus; and removing said film being said oriented block copolymer structures from said apparatus.

18. A method as defined in claim 1 wherein said inducing is caused by an evaporation of a solvent of said copolymer solution in the flow field.

* * * * *